United States Patent [19]
Takahashi

[11] 3,884,816
[45] May 20, 1975

[54] METHOD AND APPARATUS FOR DETECTING DANGEROUS ARTICLES AND/OR PRECIOUS METALS

[75] Inventor: Kanjiro Takahashi, Tokyo, Japan

[73] Assignee: Nihon Denshi Kabushiki Kaisha, Tokyo, Japan

[22] Filed: Dec. 12, 1973

[21] Appl. No.: 426,638

[30] Foreign Application Priority Data
Dec. 19, 1972 Japan............................. 47-127365
Dec. 27, 1972 Japan............................... 48-2158

[52] U.S. Cl................. 250/359; 250/363; 250/460; 250/492
[51] Int. Cl. ..................G01n 23/04; G01n 23/08; G01n 23/10
[58] Field of Search ........... 250/321, 358, 359, 363, 250/367, 460, 492

[56] References Cited
UNITED STATES PATENTS
3,780,291  12/1973  Stein et al........................ 250/363
3,790,799  2/1974  Stein et al.......................... 250/363
3,808,444  4/1974  Schneeberger et al. ........ 250/358 X

*Primary Examiner*—Paul L. Gensler
*Attorney, Agent, or Firm*—Webb, Burden, Robinson & Webb

[57] ABSTRACT

A method and apparatus for searching whereby an object is continuously or spot scanned by an X-ray having a comparatively large spot diameter. The X-rays are transmitted through the object or person being searched and detected. An output signal indicative of the transmitted X-rays is used to modulate the beam of a cathode ray tube to obtain an X-ray transmission coarse image. By observing the part of the image where X-ray absorption is high, a detailed X-ray transmission image can be obtained.

12 Claims, 8 Drawing Figures

METHOD AND APPARATUS FOR DETECTING DANGEROUS ARTICLES AND/OR PRECIOUS METALS

This invention, relates in general, to a method and apparatus for searching persons and containers for dangerous articles and/or contraband precious metals, etc. In particular, this invention relates to a method and apparatus utilizing X-ray scanning for searching for heavy objects such as firearms, swords, daggers and/or contraband precious metals.

In recent years to thwart hijacking attempts and to prevent the smuggling of contraband gold and other precious metals, airplane passengers have been subjected to a physical inspection of the person and a thorough search of their luggage, etc. The vast majority of airplane passengers are ill disposed toward bodily inspection; moreover, since conventional metal detectors are incapable of discerning the shape of metallic objects, they are ineffective as a means for the actual identification of an object. Further, conventional luggage inspection by customs officials is both laborious and time consuming.

An advantage of this invention is to provide a method and apparatus for detecting metallic weapons and contraband such that the shape of the detected metal objects can be discerned.

Another advantage of this invention is to provide a method and apparatus for searching for dangerous articles such as firearms and other lethal weapons by X-ray scanning but without subjecting the human body to the harmful effects of X-ray radiation.

Briefly, according to this invention, the human body and/or personal belongings etc. are scanned with an X-ray beam to detect the presence of metal articles. The prime factor taken into consideration is the limitation of harmful effects of X-ray radiation. Accordingly, in this invention, the body is first irradiated with a flying spot scanning beam to obtain a coarse transmission X-ray image. It is then ascertained whether part of the image has a high degree of X-ray absorption possibly attributable to the presence of sizeable lethal weapons commonly used by hijackers such as guns, swords, explosives etc. which are mostly made of iron or of other metals having a high atomic number. A high degree of X-ray absorption might also be attributable to the presence of contraband precious metals such as gold also having a high degree of X-ray absorption. Then the high absorption portion only is again subjected to X-ray irradiation and a detailed X-ray transmission image is obtained, thereby enabling the shape of the object to be clearly discerned. By this method, the quantity of irradiation to which the body is exposed is extremely small.

Other objects and advantages of this invention will become more apparent by reading the following detailed description in conjunction with the accompanying drawings of which:

Figure 1:
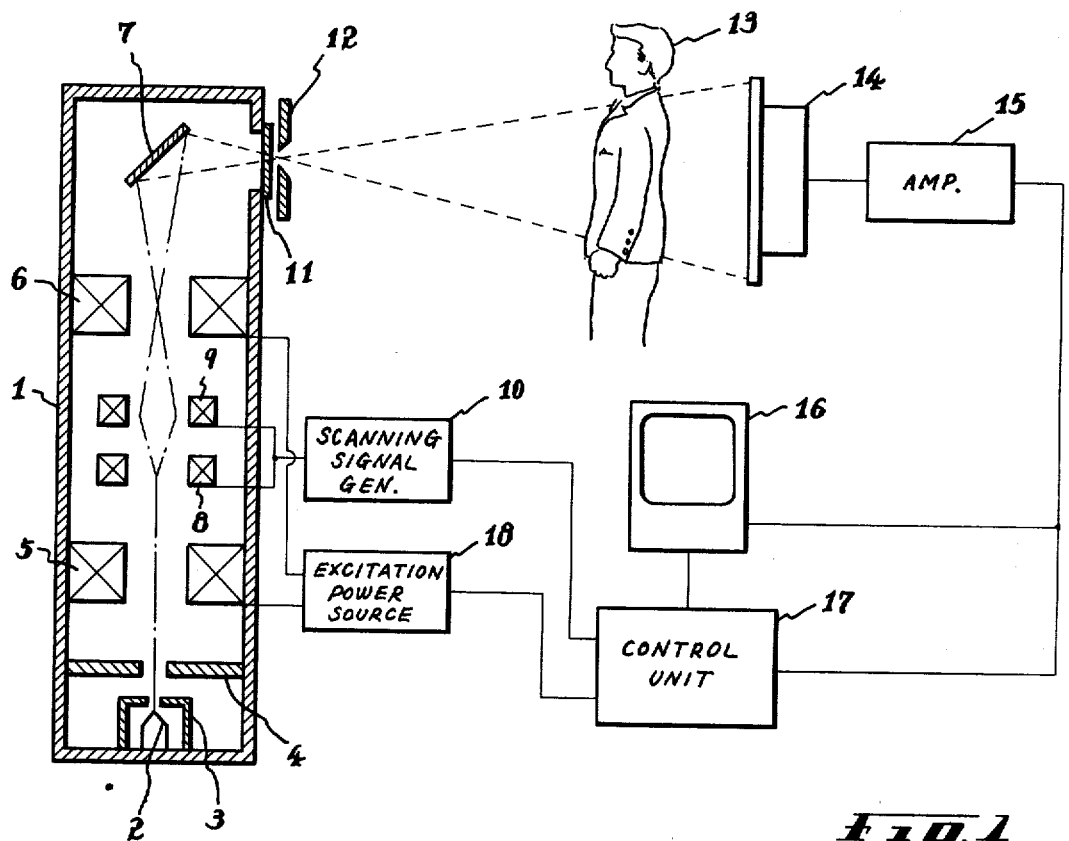
FIG. 1 is a schematic diagram of one embodiment of this invention.

In FIG. 1, an X-ray generator 1 is provided at one end with an electron gun comprised of a filament 2 and a wehnelt electrode 3. The electron beam generated by the said electron gun is accelerated by an anode 4 and focused by first and second condenser lenses 5 and 6 on an X-ray generating target 7. Electron beam deflection coils 8 and 9 are provided between said two condenser lenses, said deflection coils being supplied with vertical and horizontal deflection signals by a scanning signal generator 10. Accordingly, by means of said deflection coils 8 and 9, it is possible to two dimensionally fly spot or continuously scan the electron beam on the target 7. Further, by means of said electron beam irradiation, an X-ray is generated from the target which passes through a pinhole 12 via a transmission window 11 to irradiate an externally located object 13 such as a human body. The X-ray transmitted through said object 13 then enters an X-ray detector 14 such as a scintillation detector where it is detected. The detecting surface of said detector is formed to be either the same size as or slightly larger than the portion of the object 13 intended for irradiation, moreover, said detecting surface is uniformly sensitive over its entire length and breadth. The signal detected by the X-ray detector 14, after being amplified by an amplifier 15, is fed into a display means 16 such as a cathode ray tube, and a control unit 17 equipped with a memory means such as an electronic computer. The control unit 17 supplies control signals to both the display means 16 and the scanning signal generator 10 and condenser lens excitation power source 18.

In the above described embodiment, in order to obtain a coarse transmission image of the object 13, for example, a person's chest a control signal is first of all supplied to the scanning signal generator 10 and the excitation power source 18 by the control unit 17 to flying spot scan said object. As a result, the electron beam flying spot is caused to scan the target 7 by the deflection coils 8 and 9 in coarse steps according to the control signal, and in addition, a comparatively large spot diameter is obtained by the action of the condenser lenses 5 and 6.

The X-ray generated by the target 7 passes through pinhole 12 and is projected in a fixed direction to irradiate the object 13. Any change in the irradiating position of the electron beam on the target 7 due to a flying spot scanning change, produces a corresponding change in the position of the X-ray irradiating the object. The X-ray thus irradiating and transmitted through said object is detected by the X-ray detector 14 and the detected signal, after being amplified by the amplifier 15, is fed into the display means 16 and the control unit 17. The control unit 17 then supplies a reference or synchronization signal to the display means 16, as a result of which the display means 16 displays an X-ray transmission coarse image of the area of the object 13 irradiated by the flying spot X-ray shown in FIG.

If the diameter of the X-ray irradiating said object is for example, 2mm, an X-ray transmission image of sufficient resolution and contrast can be obtained by irradiating a picture element area of 2×2mm$^2$ with 10 to 100 X-ray quanta. Accordingly, in order to obtain a 400×400mm$^2$ X-ray transmission image of the human chest for example, the number of X-ray quanta would need to be in the order of 4×10 5 to 4×10 6. Since this number of X-ray quanta is $1/10^3$ to $1/10^5$ smaller than the number of X-ray quanta required for regular X-ray photography, harmful effects due to excessive X-ray irradiation are reduced to an absolute minimum.

Figure 2:
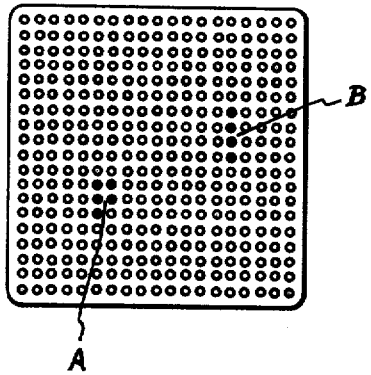
FIG. 2 shows an example of an X-ray transmission coarse image obtained by the embodiment shown in FIG. 1.

FIG. 2 shows a coarse X-ray transmission image of an object. If, for example, a person is carrying articles such as firearms, knives, daggers, etc. the articles, due to their metallic nature will absorb a larger amount of the X-ray being irradiated than the portion of the person's body surface which is not harboring any such articles.

In FIG. 2, A and B show areas where the X-ray absorption is high so that a detailed X-ray transmission image of these particular areas is obtained enabling the nature and shape of the material contained therein to be clearly discerned.

The X-ray transmission coarse image, as well as being displayed on the display means 16, is memorized by the control unit 17. The control unit 17 then sends a control signal to the scanning signal generator 10 and the excitation power source 18 in order to obtain an X-ray transmission image of the portion of the object 13 where the X-ray absorption is high.

Figure 3:
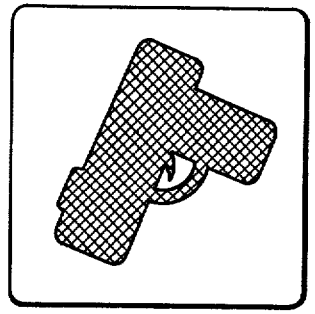
FIGS. 3 and 4 show examples of detailed X-ray transmission images obtained by the embodiment shown in FIG. 1.
Figure 4:
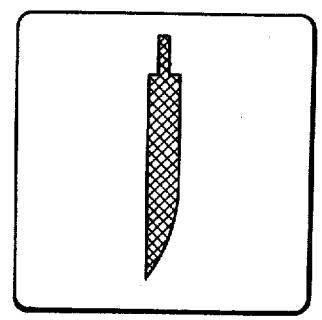

By so doing, the range of the electron beam flying spot irradiating the target is restricted and the flying spot distance is shortened, thereby causing the X-ray to irradiate only the area or areas of the object where the X-ray absorption is high. Moreover, in order to make the diameter of the X-ray irradiating the object 13 in the order of 0.1mm-0.5mm, the diameter of the electron beam irradiating the target is condensed by the condenser lenses 5 and 6, at which time it is preferable to reduce the size of the pinhole 12 in proportion to the diameter of the irradiating X-ray. Thus, a partial and detailed X-ray transmission image of the object 13 is obtained by means of an X-ray spot having a comparatively small diameter. FIGS. 3 and 4 show detailed X-ray transmission images of the high X-ray absorption areas A and B forming part of the X-ray transmission coarse image shown in FIG. 2, respectively. As the figure indicates, the nature and shape of the metallic objects can be clearly discerned.

The above detailed X-ray transmission images can be obtained by either continuously scanning or fly spot scanning the entire surface of the high X-ray absorption areas. Furthermore, with the aid of electronic computer control, it is possible to trace or plot the outline of the area or areas where the X-ray absorption is high and thereby obtain a detailed contour image of the concealed weapons, etc. An obvious advantage of the contour image is that since the number of X-ray spots irradiating the object are small, it is possible to recognize the shape of the concealed weapons etc. in a very short time; moreover, the amount of X-ray irradiation to which the human body is subjected is reduced.

Figure 5:
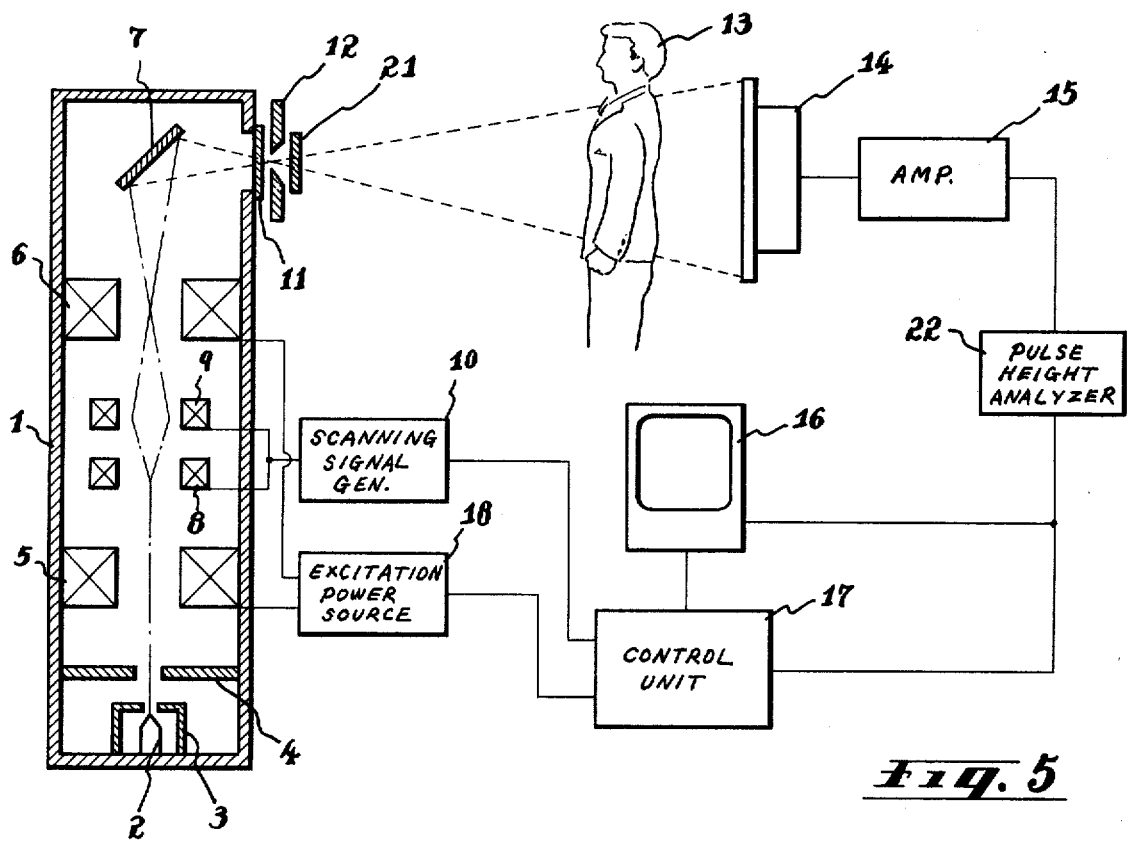
FIGS. 5, 6 and 7 are schematic diagrams showing other embodiments of this invention.

FIG. 5 shows another embodiment of this invention in which consideration has been given to further reducing the amount of X-ray irradiation absorbed by the human body. The human body, as is perhaps well known, is composed mainly of calcium and carbon, etc., that is to say, elements having atomic numbers of less than 20. On the other hand, lethal metallic weapons of the type used by hijackers and the like are composed of metallic elements such as iron, etc. which have atomic an number of more than 20, or comparatively speaking, a high atomic number. Based on this fact, the embodiment in question has incorporated a filtering device which filters out the low energy (long wave length) component of the X-ray which is readily absorbed by elements having atomic numbers lower than 20 before reaching the object.

In FIG. 5, the low energy component of the X-ray passed through pinhole 12 is absorbed by a filter 21 so that only the remaining high energy component passing through said filter 21 irradiates the object 13. The X-ray transmitted through said object is then detected by a detector 14 and the detected signal, after being amplified by an amplifier 15, is supplied to a pulse height analyzer 22. Since the pulse height analyzer supplies the display means 16 and the control unit 17 with only the signal based on the high energy X-ray forming part of the incident pulse signal, it is possible to display an X-ray transmission image of substances which absorb high energy X-ray having a good S/N ratio.

Figure 6:
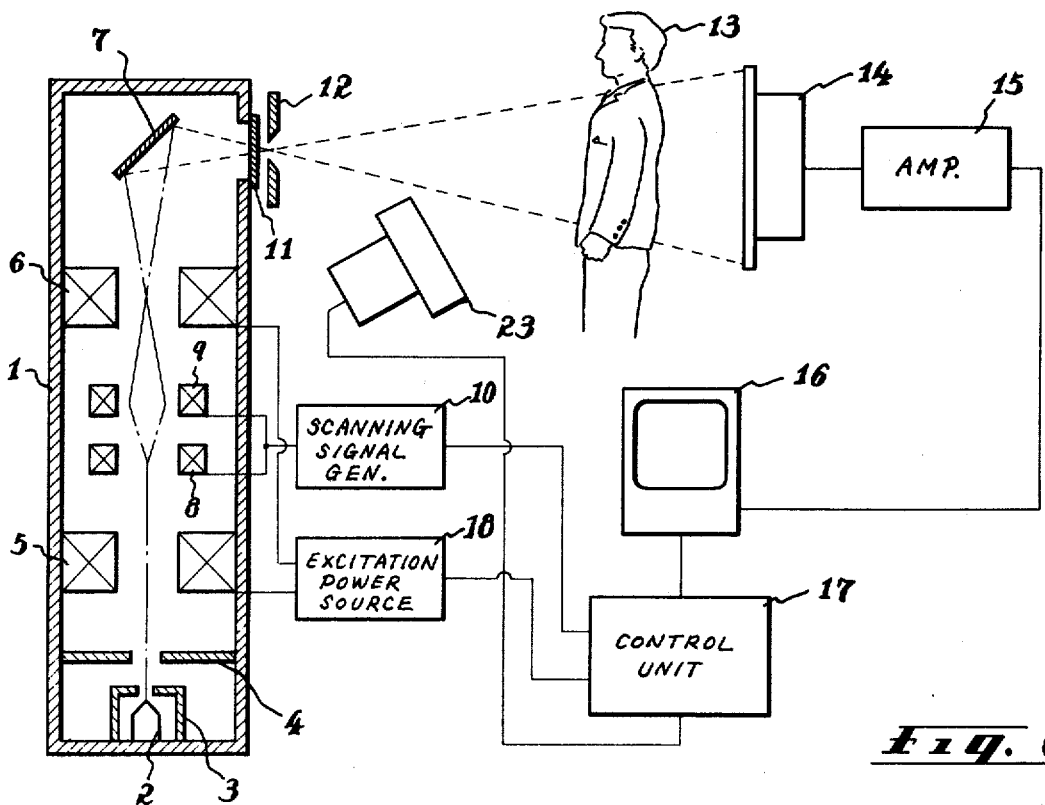

FIG. 6 shows yet another embodiment of this invention in which an image pickup tube 23 is provided in order to obtain an optical image of an object especially that of the human body. In this arrangement, an optical image signal from said image pickup tube (for example, TV camera) is fed into a control device 17 such as electronic computer, based upon which, said control unit supplies a control signal to the scanning signal generator 10, the condenser lens system excitation power source 18 and the display means 16. This embodiment is designed with a view to reducing the quantity of X-ray irradiation to which the human body is exposed while at the same time revealing the type of weapons normally concealed in the clothing of typical hijackers, by continuously scanning or flying spot scanning just the profile of the person being X-rayed. Accordingly, the scanning signal generator is controlled by the control unit 17 in accordance with the signal from the image pickup tube so that the X-ray irradiates only the profile or outline of the human body. The resultant image is displayed on the display means 16.

If X-ray high absorption materials exist, verification of the shape, etc. is carried out in the same way as in the case of the embodiment shown in FIG. 1. Actually, since it is necessary to search the front, back and sides of the object, two pieces of X-ray equipment will be necessary if it is desired to complete the search in one operation. Alternatively, if only one piece of equipment is used, the person being searched will first have to be faced towards the front and searched and then faced to one side and again searched.

Figure 7:
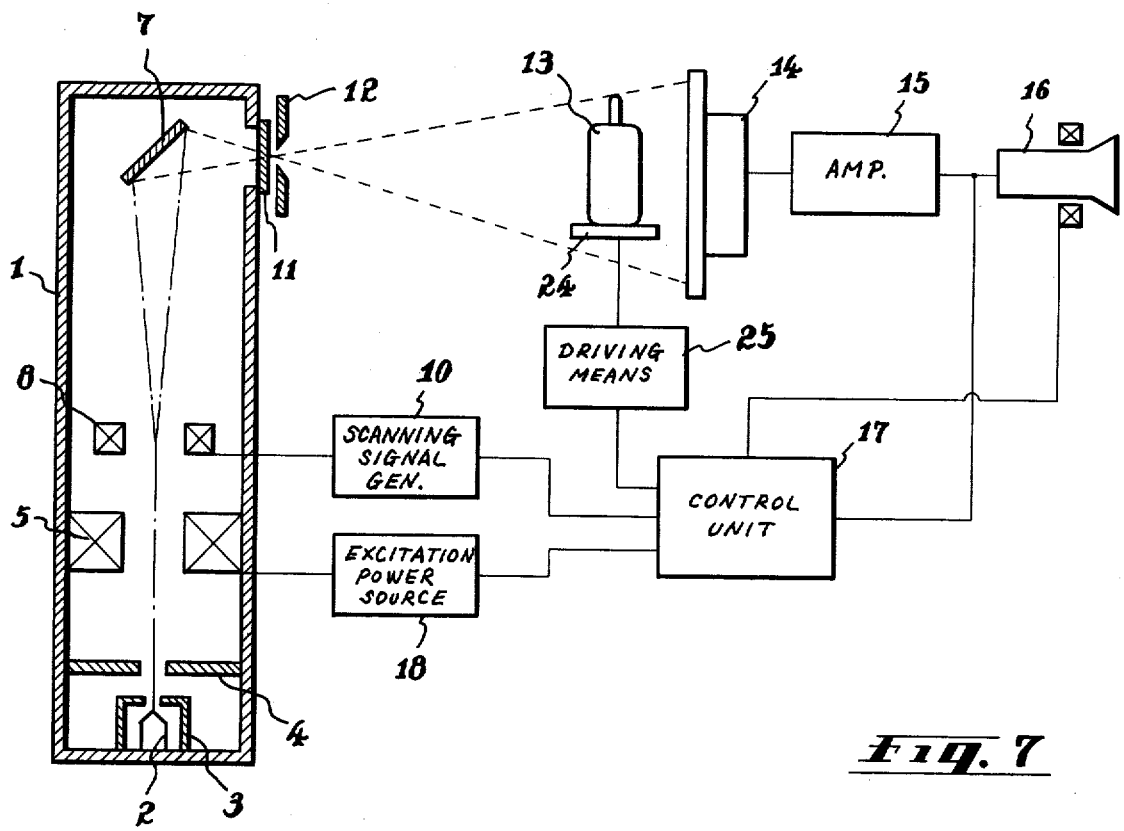
Figure 8:
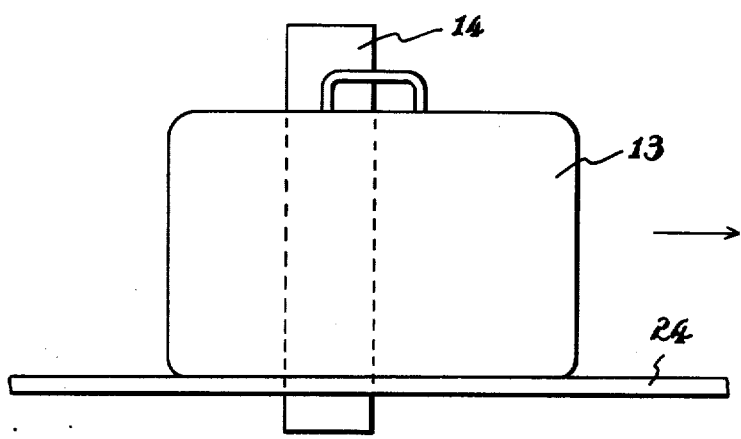
FIG. 8 shows a front view of the object irradiated in the embodiment shown in FIG. 7.

The embodiment shown in FIG. 7 is effective for use in luggage inspection. In this embodiment, the object is moved at a fixed speed while the X-ray continuously scans or flying spot scans said object in a direction perpendicular to the direction in which the object is being moved. In the figure, the electron beam generated by the electron gun is focused on an X-ray generating target 7 by a condenser lens 5 and the focused electron beam is deflected by a deflection coil 8 so as to one dimensionally continuously scan or flying spot scan the said target. The X-ray generated by said target 7, after passing through an object 13 such as a suitcase or other such item of luggage, is detected by an X-ray detector 14. Said object, by means of a driving means 25, is carried on a conveyor belt 24 at a fixed speed in the direction as indicated by the arrow in FIG. 8 and again the X-ray continuously scans or flying spot scans the object in a direction more or less perpendicular to the direction in which the object is being moved. The detector 14, as shown in FIG. 8 is narrower than the length of the object in the moving direction, that is to say, the width of the object. The signal detected by the detector after being amplified by amplifier 15, is supplied to a display means 16, such as a long persistence synchroscope, and control unit 17. Said control unit 17 supplies a control signal to said driving means 25, condenser lens 5, excitation power source 18, the deflection coil 8, scanning signal generator 10 and display means 16.

In the above described arrangement, a control signal is first sent from the control unit 17 to the driving means 25 which drives the conveyor belt 24 at a fixed speed. Then by supplying control signals to the excitation power source 18 and the scanning signal generator 10, the diameter of the electron beam spot irradiating the target 7 as well as the electron beam flying spot distance become comparatively large. Accordingly, said object is flying spot scanned by an X-ray having a comparatively large diameter, in a direction more or less perpendicular to the moving direction of the object. Thus, as the conveyor belt moves, if the presence of X-ray high absorption materials in the contents of the object is detected, a control signal is supplied to the excitation power source 18 and the scanning signal generator 10 in order to recognize the shape of said X-ray high absorption materials. That is to say, in order to obtain a detailed X-ray transmission image of the object, the spot diameter of the electron beam irradiating the target 7 becomes small and the electron beam flying spot distance also becomes short. In this case, the point which should be considered is that the object 13 is moving and also that the pinhole 12 does not move in the moving direction of the object. Accordingly, when one dimensionally flying spot scanning the X-ray on the object a second time, the position of the electron beam irradiating the target 7 must be displaced to correspond with the moving speed of said object. By flying spot scanning said target with a small diameter electron beam, the object 13 is once again one dimensionally flying spot scanned by means of a small diameter X-ray. The X-ray transmitted through the object is detected by the X-ray detector 14 and the detected signal is supplied to the display means 16. Since signals corresponding to the shift of the conveyor belt 24 and the position of the electron beam on the target 7 are supplied to said display means by control unit 17, a detailed transmission X-ray image of the object 13 is displayed on said display means, thus making it possible to discern the shape of the X-ray high absorption object.

This invention is not limited to the precise embodiments heretofore described. A variety of equivalent configurations are possible. For example, in order to obtain a detailed X-ray transmission image of the high absorption part of the object, it is possible to continuously scan the object instead of fly spot scanning the necessary part of the object with a small diameter X-ray. Further, the display means for displaying the X-ray transmission image is not absolutely necessary as it is possible to obtain a detailed transmission image of the X-ray high absorption part of the object by using a display monitor or recording means in conjunction with an electronic computer.

Moreover, the type of X-ray generator shown in the aforedescribed embodiments can be replaced by a generator incorporating a transmission type X-ray generating target or one in which the electron beam is electrostatically deflected.

Still further, although a large diameter electron beam (greater than about 1mm diameter) is used in the case of a coarse image, it is also possible to use a small diameter electron beam (less than about 1mm diameter).

Having thus described the invention with the detail and particularity as required by the Patent Laws, what is desired protected by Letters Patent is set forth in the following claims.

I claim:

1. A method for searching objects for metallic articles such as weapons or contraband comprising the steps for:
   a. generating and accelerating an electron beam,
   b. irradiating said electron beam on a target,
   c. irradiating an object to be searched with an X-ray obtained by scanning said electron beam in coarse steps on said target,
   d. detecting the X-ray transmitted to said object,
   e. surveying the portion of the object where the X-ray absorption is comparatively high by means of said detected signal, and
   f. obtaining a detailed X-ray transmission image of said portion of the object where the X-ray absorption is comparatively high.

2. Method according to claim 1 in which the X-ray irradiating the object continuously scans said object in two-dimensional raster.

3. Method according to claim 1 in which the X-ray irradiating the object fly spot scans the object in a two-dimensional raster.

4. A method for searching an object or person for metallic articles such as weapons or contraband comprising the steps for:
   a. generating and accelerating an electron beam,
   b. irradiating said electron beam, condensed so as to have a comparatively large spot diameter on a target,
   c. irradiating an object to be searched with an X-ray obtained by scanning said electron beam in coarse steps on said target,
   d. detecting the X-ray transmitted to said object,
   e. surveying the portion of the object where the X-ray absorption is comparatively high by means of said detected signal, and
   f. obtaining a detailed X-ray transmission image of said portion of the object where the X-ray absorption is comparatively high.

5. Method according to claim 4 in which the step for obtaining a detailed image comprises the steps for:
   a. irradiating an electron beam, condensed to have a small spot diameter on the target,
   b. scanning the electron beam on the target to irradiate a scanned X-ray on a specified area of the object, and
   c. reproducing an image of the X-ray transmitted to the object.

6. A method for searching an object or person for metallic articles such as weapons or contraband comprising the steps for:
   a. generating and accelerating an electron beam,
   b. irradiating said electron beam, condensed to have a comparatively large spot diameter on a target, c. scanning the electron beam in coarse steps on said target so as to irradiate a scanned X-ray on the outline of the object to be searched only, d. detecting the X-ray transmitted to said object, e. surveying the portion of the object contained in the outline where the X-ray absorption is comparatively high by means of said detected signal, and f. obtaining a detailed X-ray transmission image of the portion of the outline image where the X-ray absorption is comparatively high.

7. A method for searching an object or person for metallic articles such as weapons or contraband comprising the steps for:

a. obtaining an optical image of the object to be searched, b. generating and accelerating an electron beam, c. irradiating said electron beam, condensed to have a comparatively large spot diameter on a target, d. scanning the electron beam in coarse steps on said target to irradiate a scanned X-ray within the outline of the object to be searched as determined by the optical image, e. detecting the X-ray transmitted to said object to find any portion of the object within the outline where the X-ray absorption is comparatively high, and f. obtaining a detailed X-ray transmission image of the portion within the outline image where the X-ray absorption is comparatively high.

8. A method for searching an object for metallic articles such as weapons or contraband comprising the steps for a. generating and accelerating an electron beam, b. irradiating the object to be searched with an X-ray scanned in one direction, by scanning a target with said electron beam, c. moving the object to be searched in a direction perpendicular to the said X-ray scanning direction at a fixed speed, d. detecting the X-ray transmitted to said object, e. surveying the portion of the object where the X-ray absorption is high by means of said detected signal, and f. obtaining a detailed X-ray transmission image of said portion of the object where the X-ray absorption is high.

9. An apparatus for searching objects for metallic articles such as weapons or contraband comprising:

a. means for generating and accelerating an electron beam, b. a target generating an X-ray from the irradiation of said electron beam, c. a condenser lens system for condensing said electron beam and irradiating it on said target, d. a deflection means for changing the position of the electron beam on said target, e. a pinhole X-ray window located opposite said target, f. a detector for detecting the X-ray transmitted to an object to be searched through said window, g. means for memorizing the output signal of said detector indicative of a metallic article at a position on said object to be searched in accordance with the position at which the electron beam irradiates the target, h. means for controlling the current supplied to said condenser lens system and electron beam deflection means according to said memorized output signal to provide a detailed X-ray image of only positions where the detector provides an output indicative of a metallic article, and i. means for displaying a picture image of said output signal.

10. An apparatus as described in claim 9 in which a comparatively low energy X-ray absorption filter is placed between the electron beam target and the object to be searched.

11. An apparatus for searching for metallic articles such as weapons and contraband comprising:

a. means for moving the object to be searched at a fixed speed, b. means for generating and accelerating an electron beam, c. a target for generating an X-ray from the irradiation of the electron beam, d. a condenser lens system for condensing said electron beam and irradiating it on said target, e. deflection means for changing the position of said electron beam on said target, f. a pinhole X-ray window located opposite said target, g. a detector for detecting the X-ray transmitted to an object to be searched through said window, h. means for memorizing the output signal of said detector indicative of a metallic article on the object to be searched in accordance with the position at which the electron beam irradiates the target, i. means for controlling the current supplied to said condenser lens system and electron beam deflection means according to said memorized output signal to provide a detailed X-ray image of only the positions where the detector provides an output indicative of a metallic article, and j. means for displaying a picture image of said output signal.

12. An apparatus for searching objects for metallic articles such as weapons and contraband comprising:

a. means for generating and accelerating an electron beam, b. a target for generating an X-ray from the irradiation of said electron beam, c. a condenser lens system for condensing said electron beam and irradiating it on said target, d. deflection means for changing the position of the electron beam on said target, e. a pinhole X-ray window located opposite said target, f. a detector for detecting the X-ray transmitted to an object to be searched, g. means for memorizing the output signal of said detector indicative of a metallic article at a position on the object in accordance with the position at which the electron beam irradiates the target, h. means for controlling the current supplied to said condenser lens system and electron beam deflection means according to said memorized output signal to provide a detailed X-ray image of only the positions where the detector provides an output indicative of a metallic article, i. device for displaying a picture image of said output signal, and, j. means for obtaining an optical image of the object.

* * * * *